UNITED STATES PATENT OFFICE.

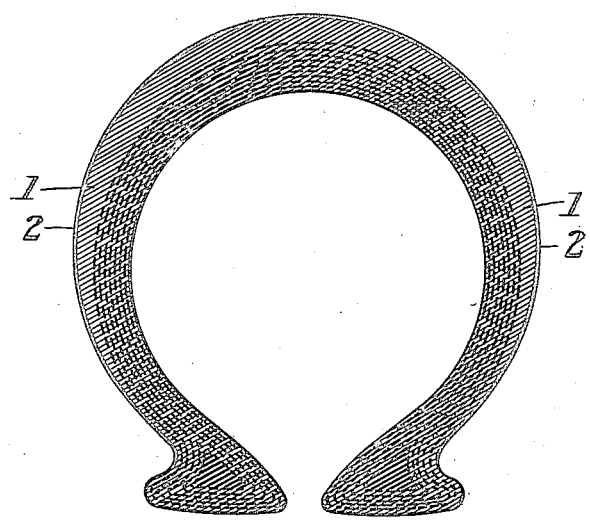

JAMES TODD, OF PITTSBURGH, PENNSYLVANIA, ASSIGNOR TO THE STERLING VARNISH COMPANY, OF PITTSBURGH, PENNSYLVANIA, A CORPORATION OF PENNSYLVANIA.

RUBBER TIRE.

1,424,787.   Specification of Letters Patent.   Patented Aug. 8, 1922.

Application filed February 6, 1917. Serial No. 147,378.

*To all whom it may concern:*

Be it known that I, JAMES TODD, a citizen of the United States, residing at Pittsburgh, in the county of Allegheny and State of Pennsylvania, have invented a new and useful Improvement in Rubber Tires, of which the following is a full, clear, and exact description, reference being had to the accompanying drawings, forming part of this specification, which illustrates a cross section of an automobile tire embodying the invention.

The object of the invention is to protect the rubber of a tire, such, for example, as an automobile tire, during the period between the time of its manufacture and its actual use on an automobile. With this object in view, the invention consists in a method and article, such as hereinafter described and particularly pointed out in the claims.

Referring to the illustrated embodiment of the invention, the rubber tire 1 has applied to it, after manufacture, a surface coating 2 of a material which excludes the air, light and water from the rubber. The inner surface of the tire is generally so well protected by the fibre or cloth lining and by chalk that it is preferred to apply the coating to the outer surface only, although I do not intend to so limit my invention, as it might, under some circumstances, be desirable to coat the inner surface in addition to the outer surface. The preferred method is to apply directly to the newly manufactured tire a paint or varnish made of asphalt and petroleum benzine. The benzine acts as a solvent for the asphalt base and has little, if any, effect on the rubber, as it evaporates quickly and after having evaporated, leaves a coating of asphalt which keeps out the water, light and air. This asphalt is black, and therefore, is a good light-excluding material. After the tire is put into service, the coating, of course, wears off, it having served its purpose of protecting the rubber during the period of storage after manufacture and before the tire is put into service.

The foregoing method is found to preserve the rubber and to prevent or greatly retard the deterioration of the rubber which usually takes place if the tire is stored for any length of time between manufacture and use.

A tire with the coating of black varnish above described may be carried on an automobile without the necessity of putting on the ordinary tire covers, since the coating prevents the action of light, water and air upon the tire. Moreover, the coating presents a neat appearance which is desirable in case the tire is carried on the automobile.

While it is preferred to use a varnish of asphalt and petroleum benzine, it is to be understood that other good quick drying black varnishes may be used. The invention is not limited to its preferred embodiment, but may be employed in other methods and constructions within the scope of the following claims.

I claim:

1. As a new article of manufacture, a pneumatic tire casing having on its outer surface a black varnish coating substantially impervious to light, water and air, deposited on said surface from a quick drying solution in a volatile solvent which does not materially injure the rubber, substantially as described.

2. As a new article of manufacture, a pneumatic tire casing having on its outer surface a black asphalt varnish coating substantially impervious to light, water and air, deposited on said surface from a solution containing petroleum benzene, substantially as described.

3. The process of preserving rubber pneumatic tire casings, which consists in applying directly to the outer surface of the tire casing an opaque water- and air-proof quick drying black varnish containing a volatile solvent which will evaporate quickly without materially injuring the rubber, allowing the solvent to evaporate and leave deposited on said surface a coating which is substantially impervious to light, water and air and thereby protecting the rubber against deterioration, substantially as described.

4. The process of preserving rubber pneumatic tire casings, which consists in applying directly to the outer surface of the tire casing an opaque water- and air-proof quick drying asphalt varnish containing petroleum benzene, which serves as a solvent for the asphalt when applied and quickly evaporates without materially injuring the rubber, allowing the petroleum benzene to evaporate and leave deposited on said surface a coating which is substantially impervious to light, water and air, and thereby protecting the rubber against deterioration, substantially as described.

In testimony whereof, I have hereunto set my hand.

JAMES TODD.

Witnesses:
  Geo. H. Parmelee,
  H. M. Corwin.